(12) United States Patent
Hendricks

(10) Patent No.: US 11,557,941 B2
(45) Date of Patent: Jan. 17, 2023

(54) ELECTRONICALLY COMMUTATED AXIAL CONDUCTOR MOTOR

(71) Applicant: Robert C. Hendricks, Woodbine, MD (US)

(72) Inventor: Robert C. Hendricks, Woodbine, MD (US)

( * ) Notice: Subject to any disclaimer, the term of this patent is extended or adjusted under 35 U.S.C. 154(b) by 277 days.

(21) Appl. No.: 16/816,547

(22) Filed: Mar. 12, 2020

(65) Prior Publication Data

US 2020/0295633 A1    Sep. 17, 2020

Related U.S. Application Data

(60) Provisional application No. 62/818,494, filed on Mar. 14, 2019.

(51) Int. Cl.
   *H02K 11/33* (2016.01)
   *H02K 5/22* (2006.01)

(52) U.S. Cl.
   CPC .......... *H02K 11/33* (2016.01); *H02K 5/225* (2013.01); *H02K 2211/03* (2013.01)

(58) Field of Classification Search
   CPC .... H02K 11/33; H02K 5/225; H02K 2211/03; H02K 3/12; H02K 3/28; H02K 3/50; H02K 41/02; H02K 2213/06; H02K 2213/09; H02K 2213/12
   USPC ............................................. 310/71, DIG. 6
   See application file for complete search history.

(56) References Cited

U.S. PATENT DOCUMENTS

| | | | |
|---|---|---|---|
| 3,781,980 A | 1/1974 | Possis | |
| 4,096,625 A | 6/1978 | Morreale | |
| 4,115,915 A | 9/1978 | Godfrey | |
| 4,549,036 A | 10/1985 | Reichbach | |
| 4,835,839 A | 6/1989 | Forbes | |
| 5,374,865 A | 12/1994 | Yoshimura | |

(Continued)

FOREIGN PATENT DOCUMENTS

| | | | |
|---|---|---|---|
| DE | 102019201381 A1 * | 8/2020 | |
| WO | 2004073156 A1 | 8/2004 | |

(Continued)

OTHER PUBLICATIONS

English translation of DE 102019201381 A1.*

*Primary Examiner* — John K Kim

(74) *Attorney, Agent, or Firm* — Florek & Endres PLLC

(57) ABSTRACT

An electronic motor with a stator core having a plurality of holes for receiving a plurality of conductors, each conductor comprising a substantially linear body portion extending within the holes of the stator core, and a stator drive member adjacent each end of the stator core, the stator end member adjacent at least one end of the stator core including electronic control circuitry electrically coupled to at least some of the conductors.

Also, a method of manufacturing an electronic motor by providing a stator with a plurality of holes having conductors within at least some of the plurality of holes, said conductors each having a substantially linear body portion extending through the stator core, and placing a drive member on each end of the stator core, at least one of the drive members provided with electronic circuitry, where the conductors are electrically coupled to the circuitry in the drive member.

17 Claims, 6 Drawing Sheets

(56) References Cited

U.S. PATENT DOCUMENTS

| | | | |
|---|---|---|---|
| 5,376,866 A | 12/1994 | Erdman | |
| 5,585,708 A | 12/1996 | Richardson et al. | |
| 5,731,649 A | 3/1998 | Caamano | |
| 5,912,522 A | 6/1999 | Erdman | |
| 6,078,117 A | 6/2000 | Perrin | |
| 6,191,506 B1 | 2/2001 | Wright | |
| 6,249,956 B1 | 6/2001 | Maeda | |
| 6,339,871 B1 | 1/2002 | Maesoba | |
| 6,448,686 B1 | 9/2002 | Dawson | |
| 6,570,361 B1 | 5/2003 | Edelson | |
| 6,657,334 B1 | 12/2003 | Edelson | |
| 6,838,791 B2 | 1/2005 | Edelson | |
| 6,938,323 B2 | 9/2005 | Katou | |
| 6,998,752 B2 | 2/2006 | Takashi | |
| 7,183,688 B2 | 2/2007 | Hans | |
| 7,343,662 B2 | 3/2008 | Gorohata | |
| 7,353,586 B2 | 4/2008 | Majernik | |
| 7,582,999 B2 * | 9/2009 | Atkinson | H02K 3/50 310/179 |
| 7,587,807 B2 | 9/2009 | Bourqui | |
| 7,759,836 B2 | 7/2010 | Laing | |
| 7,852,037 B2 | 12/2010 | Edelson | |
| 7,928,683 B2 | 4/2011 | Edelson | |
| 7,936,116 B2 | 5/2011 | Asou | |
| 7,937,823 B2 | 5/2011 | Alfermann | |
| 8,237,316 B2 | 8/2012 | Bischof | |
| 8,299,673 B2 | 10/2012 | Edelson | |
| 8,736,127 B2 * | 5/2014 | Schlote | H02K 3/12 310/198 |
| 8,740,584 B2 | 6/2014 | Yoshino | |
| 8,932,500 B2 | 1/2015 | Hong | |
| 9,472,987 B1 | 10/2016 | Hall | |
| 9,742,246 B2 | 8/2017 | Vehige | |
| 9,755,467 B2 | 9/2017 | Lee | |
| 9,847,687 B2 | 12/2017 | Ramamoorthy | |
| 11,137,736 B2 * | 10/2021 | Steinbach | H02P 25/03 |
| 2002/0084712 A1 | 7/2002 | Hyun | |
| 2003/0201686 A1 | 10/2003 | Narita | |
| 2004/0061396 A1 | 4/2004 | Narita | |
| 2005/0108870 A1 | 5/2005 | Harada | |
| 2007/0062026 A1 | 3/2007 | Pizzichil | |
| 2007/0273218 A1 * | 11/2007 | Atkinson | H02K 3/50 310/201 |
| 2008/0054733 A1 | 3/2008 | Edelson | |
| 2008/0201935 A1 | 8/2008 | Nakayama | |
| 2009/0026868 A1 | 1/2009 | Morgante | |
| 2009/0200888 A1 | 8/2009 | Tanaka | |
| 2009/0236930 A1 | 9/2009 | Nashiki | |
| 2010/0052451 A1 | 3/2010 | Lee | |
| 2010/0109589 A1 * | 5/2010 | Harada | H02P 29/0241 318/400.33 |
| 2010/0123426 A1 | 5/2010 | Nashiki | |
| 2010/0230194 A1 | 9/2010 | James | |
| 2010/0236059 A1 | 9/2010 | Mishina | |
| 2010/0247347 A1 | 9/2010 | Yoshino | |
| 2010/0264757 A1 | 10/2010 | Asou | |
| 2010/0301698 A1 | 12/2010 | Goto | |
| 2012/0025746 A1 | 2/2012 | Kawakubo et al. | |
| 2013/0020890 A1 * | 1/2013 | Iki | H02K 9/227 310/71 |
| 2014/0134014 A1 | 5/2014 | Mera et al. | |
| 2014/0319960 A1 * | 10/2014 | Iki | H02K 3/12 310/216.115 |
| 2015/0010412 A1 | 1/2015 | Liu | |
| 2015/0365003 A1 * | 12/2015 | Sadwick | H02M 3/28 363/21.01 |
| 2016/0036289 A1 * | 2/2016 | Kawata | B62D 5/0463 310/71 |
| 2016/0248288 A1 | 8/2016 | Bastien | |
| 2016/0372982 A1 | 12/2016 | Sailor | |
| 2016/0372985 A1 | 12/2016 | Sailor | |
| 2017/0149368 A1 | 5/2017 | Pietromonaco | |
| 2017/0194845 A1 | 7/2017 | Tang | |
| 2017/0237322 A1 | 8/2017 | Matsushita | |
| 2017/0353072 A1 | 12/2017 | McSheery | |
| 2017/0358965 A1 * | 12/2017 | Pithwa | H02K 5/04 |
| 2018/0342914 A1 | 11/2018 | Saito et al. | |
| 2019/0002013 A1 * | 1/2019 | Terdy | H02P 27/085 |
| 2019/0013711 A1 * | 1/2019 | Mikail | H01F 5/04 |
| 2020/0295633 A1 * | 9/2020 | Hendricks | H02K 3/50 |
| 2021/0242815 A1 * | 8/2021 | Hongyo | H02P 25/18 |

FOREIGN PATENT DOCUMENTS

| | | |
|---|---|---|
| WO | 2006065988 A1 | 6/2006 |
| WO | 2018033761 A1 | 2/2018 |

* cited by examiner

Baldor Electric Co. motor, Model 617M

6-10. Motor Rewind Data
The following motor rewind data is furnished in the event it is necessary to rewind the stator.
*a. Stator:*
(1) Number of poles .............. 2
(2) Number of coils .............. 36
(3) Number of slots .............. 36
(4) Turns per coil ................. 13 turns of (2) No. 19 AWG in parallel
(5) Coil span ....................... 1-14
(6) Wire size ....................... No. 19 AWG

FIG. 6

ELECTRONICALLY COMMUTATED AXIAL CONDUCTOR MOTOR

FIELD OF THE INVENTION

The present invention relates to electronic induction motors, and more particularly to an electronically commutated axial conductor motor.

BACKGROUND OF THE INVENTION

The three-phase induction motor is the workhorse of industry, and is produced in large quantities all over the world. Regardless of size, the standard design of this type of motor has the common features of a ferrous stator, usually constructed of a laminated stack of punched steel plates, and a set of windings inserted into longitudinal slots distributed radially around the inside circumference of the stator.

To date, the problem of automating these windings has not been solved and at best is likely to require complex and expensive robotics, yielding neither a reduction in manufacturing cost nor significant improvement in motor performance. Therefore the majority of three-phase induction motors are assembled using manual labor, at least for the process of lacing, insulating and inserting the windings into the slots. Furthermore, the fixed quantity, size, and turn count of these windings limits a given motor to a small number of applications, and necessitates complex and inefficient external power electronics to effect a useful system of variable speed and torque control.

The conductor motor of the present invention provides a radically different stator construction that permits direct electronic commutation of the stator conductors, while simultaneously offering a new and readily automated means of motor assembly.

SUMMARY OF THE INVENTION

The present invention is directed to an electronically commutated axial conductor motor ("ECACM"), or merely motor, comprising a stator assembly or core having a plurality of holes therein and a plurality of conductors comprising a substantially linear body portion extending within the holes of stator core, and a stator drive or end member adjacent each end of the stator core, the stator drive member adjacent at least one of the ends of the stator core comprising electronic control circuitry where the conductors are electrically coupled to the circuitry in the drive member.

In a preferred embodiment, the motor incorporates a stator core comprising an assembled laminated stack of steel plates with a cylindrical cross section. Rather than having slots for the conductor windings, the laminated plates are punched with an evenly distributed set of holes corresponding to the diameter and quantity of stator conductors through which the linear body portion of the conductors pass.

Rather than coils of wire, the preferred conductors are individual wires of hard copper or similarly suitable conductor material, preferably with a thin insulation of an oxide, enamel or other suitable insulation composition, the conductor being rigid enough to be inserted through the laminate holes by machine. Insulation should not be critical since the conductors provide a path of significantly less resistance than the stator laminate stack. When the substantially linear body portions of the conductors are placed within the holes of stacked laminated members, it forms the stator core.

The conductors preferably comprise discrete straight members that terminate in drive members at both ends of the stator core, the drive members preferably comprising a ring in a circular embodiment, which may effectively be a large, circular integrated circuit for electronic commutation at one or both ends of the stator core. In one variant, the end drive ring comprises an integrated circuit at both ends, and in another variant the end drive ring comprises an integrated circuit at one end and a printed circuit board at the other end, providing links between pairs of conductors so that the conductors with the printed circuits in the drive member form U-shaped loops.

Each conductor or U-shaped conductor loop is terminated at each end in a group of bidirectional solid-state or semiconductor switches, or a plurality of solid-state switches combined in a bidirectional bridge configuration, formed of transistors (IGBT, FET or similar) installed or fabricated directly onto the end member integrated circuit board. The switch circuits provide commutation to and from a negative and positive DC bus on the end drive member, or in another variant using a matrix converter to synthesize the required commutation pattern, directly from single-phase or three-phase AC busses.

Each switching circuit is driven by logic circuitry connected to a microcontroller 20. A typical circuit for a single conductor is illustrated in FIG. 2. The arrangement permits each individual conductor or conductor loop to be "fired," with corresponding timing and pulse width control, by the microprocessor.

The conductors may be fired in staggered groups in any number of combinations and with variable duty cycle. In this manner, a rotating electromagnetic field of variable strength and speed may be synthesized with any desirable number of poles, permitting precise torque and speed control at optimized efficiency.

The motor of the present invention has a wide variety of applications and advantages over known induction motors, which will be briefly described here.

The motor described here is a direct digital motor that can take the place of a standard three-phase induction motor, and an electronic variable speed motor drive, with the ability to synthetically duplicate the sensor-less vector control capabilities of electronic drives at a lesser cost.

The invention potentially offers a universal replacement for many different kinds of standard three-phase motors of a given horsepower, since the stator may be digitally controlled to duplicate a 2-pole, 4-pole, 6-pole or other configuration motor. This also offers a choice of speed vs. torque regimes in the same motor frame; in effect, an "electronic gearshift" capability.

The switching connections to the power busses provide the capability, through direct digital control, to switch regenerative power back to the buss when braking or decelerating, or even to use the motor directly as an alternator or DC generator. As such, the motor of the present invention has inherent regenerative capability.

The following additional benefits of the present invention include:

1. Discrete, bidirectional commutation of each conductor.
2. Pulse-width or duty-cycle modulation of each conductor in cascading patterns to synthesize infinitely variable sinusoidal fields.
3. Continuously variable synthesis of moving magnetic fields from a DC supply bus, single-phase or three-phase AC bus.
4. For N conductors, the number of poles may be dynamically varied from 2 to N/2, supporting:
   a. variable speed/torque regimes (electromagnetic equivalent of gear shift);

b. modularity, where one motor frame may serve as a drop-in replacement for many.

5. Common induction motor stators have a small, even number of multi-turn windings that are often driven by an external Variable Frequency Drive (VFD), however, each of the present conductors is an internal element of the VFD, between opposing commutation circuitry.

6. True motor-generator: all variants may operate in motive and regenerative modes, delivering electrical power to the mechanical load, or returning mechanical energy to electrical power, while accelerating or decelerating The motor of the invention also lends itself to automated production; the end-rings may be produced using integrated circuit fabrication techniques, and the conductors inserted into the stator core by machine, saving labor costs. The stator assembly may be designed to fit directly into existing National Electrical Manufacturers Association (NEMA) motor frames using standard rotors.

Accordingly, the present invention is also directed to a method of manufacturing a conductor motor comprising the steps of providing a stator core comprising a plurality of holes having conductors within at least some of the plurality of holes, said conductors having a substantially linear body portion extending through the stator core, placing an end member on each end of the conductors. At least one of the end members is provided with electronic circuitry, where the conductors are electrically coupled to the electronic circuitry in the end members.

BRIEF DESCRIPTION OF THE DRAWINGS

The attached drawings, in which like reference characters represent like parts, are intended to better illustrate a preferred embodiment of the present invention without limiting the invention in any manner whatsoever.

FIG. 6 is a chart showing data from a stator rewinding manual.

DETAILED DESCRIPTION OF THE PREFERRED EMBODIMENT

Figure 1:
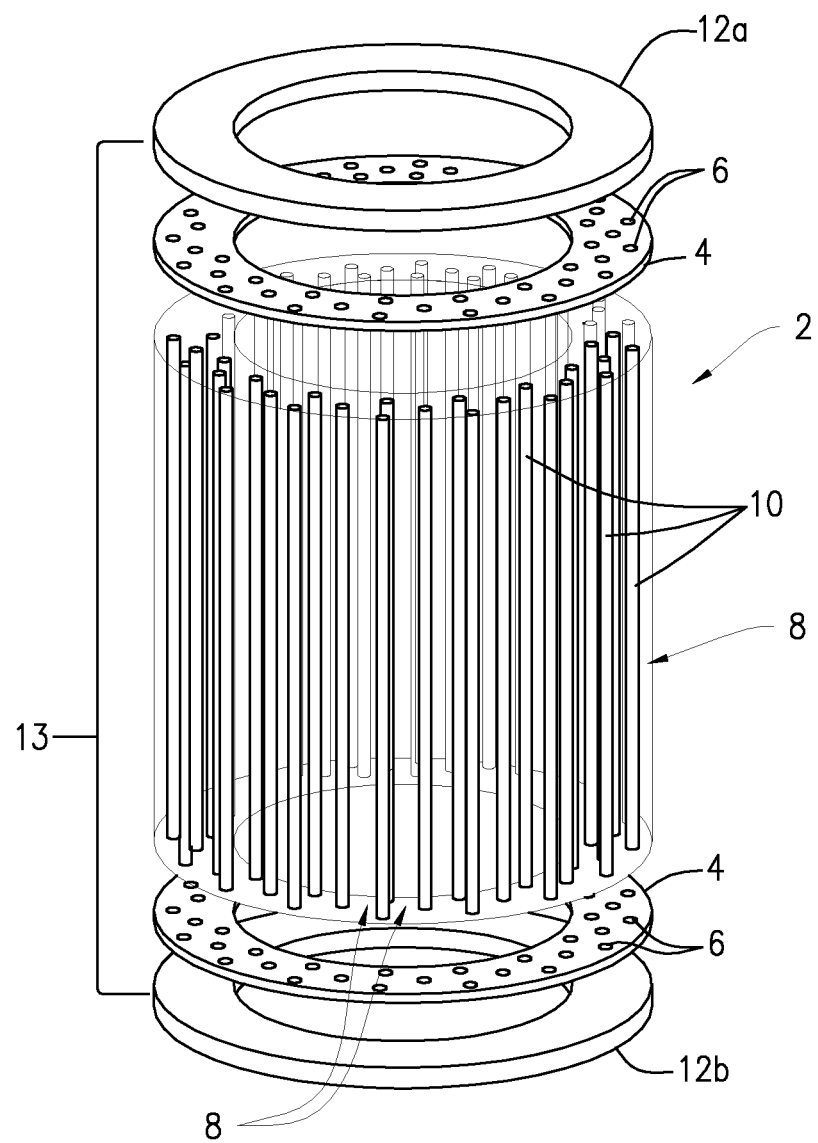
FIG. 1 is an exploded perspective view of an embodiment of the motor of the present invention.
Figure 2:
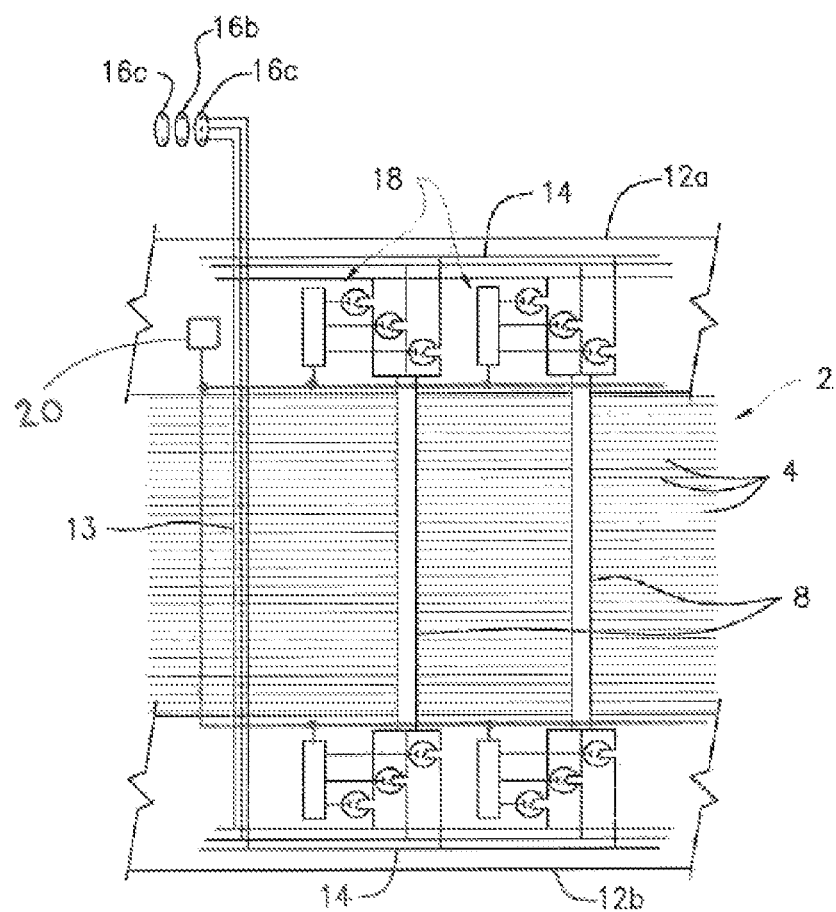
FIG. 2 is a schematic of an embodiment of the motor of the present invention showing the electronics associated with both the upper and lower end members.

The following description of the preferred embodiment is presented to describe the present invention without limiting the scope of the appended claims in any manner whatsoever.

As shown in FIGS. 1-5, the present claimed invention is directed to an electronic motor comprising a stator assembly or core 2, preferably formed of laminated stack or plate elements 4, having a plurality of holes 6 therein and a plurality of conductors 8 comprising a substantially linear body portion 10 extending within the holes 6 of stator core 2, and a stator drive member 12 adjacent each end of the stator core 4, the stator end member 12 adjacent at least one of the ends of the stator core 4 comprising electronic control circuitry 14.

A power jumper 13 provides an electrical connection between upper and lower stator end members 12 having one or more switches 18 coupled to the conductors 8, and to an output connection, shown in FIG. 1 with an optional DC connection 16a, single phase connection 16b and 3-phase connection 16c.

Although the stator core 2 is preferably formed of a laminated stack of steel elements 4, the conductors 8 can be surrounded by any suitable insulation magnetic core material, either laminated or solid, including but not limited to ferrite or powdered iron compounds.

Similarly, the conductors 8 can be made of any suitable conductor material, including any of a wide variety of metals or similar electrically conductive material. Moreover, the conductor linear body portions 10 can have any suitable length between the upper end member 12a and the lower end member 12b, dependent on the motor size and format for a general or particular application.

The upper and lower end members 12a and 12b can be formed of any suitable material, including but not limited to fiberglass resin or a phenolic, ceramic or similar non-conductive substrate material, and may include apertures in which the conductors 8 extend for connection with the control circuitry 14. The number and pattern of the apertures may be anything suitable for the intended purpose. Alternatively, an electrical connection may be effected between the end members and the conductors by means of a direct pressure contact on conductive circuit traces formed upon the end member.

Most preferably, the control circuitry 14 connected to the conductors 8 provides for multiple motor functions, including one or more of a DC connection, a single-phase connection and a 3-phase connection. Notwithstanding, the nature of the stator core 2 and electronic circuitry 14 associated with the conductors 8 permit virtually any multiple phase and/or multiple pole configurations.

For example, the typical 3-phase induction motor stator 2 shown in FIG. 1 includes the discrete, bidirectional commutation of each conductor 8, with discrete straight conductors 8 replacing windings, allowing for fully automated assembly and production. As described above, the stator core 2 may comprise a laminate stack of annular plates or rings 4, perforated to accept the straight connectors 8, eliminating slots. The conductors 8 may be fed from opposing power busses in the drive or end members 12 via embedded solid state switches, eliminating winding end loops and minimizing wasteful lateral winding currents.

The following simple calculations are intended to explore the stator voltage, current, and the stator conductor size & quantity, required for an Electronically Commutated Axial Conductor Motor (ECACM) to approximately match the performance of a typical wire-wound stator three-phase squirrel-cage induction motor.

The representative commercial motor selected is a 2-HP 208V 3-phase, 2-pole motor manufactured by Baldor. The motor specifications are as follows:

| | |
|---|---|
| Catalog Number: | 617M |
| Horsepower: | 2 |
| Voltage: | 208 |
| Hertz: | 60 |
| Phase: | 3 |
| Full Load Amps: | 5.7 A |
| Poles: | 2 |
| RPM: | 3450 |
| NEMA Frame: | 145T |

Using the values for a 208 v Delta connection, the full-load current figure of 5.7 A yields a total power rate of 1186 VA per phase leg, for a total of 3,558 VA. A motor operating at full load consumes real power at the rate of 746 W/HP divided by efficiency. Assuming 80% efficiency, the formula yields a real power consumption of (2×746 W)/0.8=1865 W. The power factor of the motor, 1865 W/3558 VA, is therefore about 0.52.

To match the performance of this motor in a similar frame size, we need to match the magnetic flux in the stator. Since this magnetic flux is proportional to the current in the winding multiplied by the number of turns (assuming a stator core of identical reluctance, i.e., the same length, cross-sectional area and material), we need to know the number of turns of wire in the windings. A stator rewinding manual for the motor (part of a pump maintenance manual) gives the data shown in FIG. 6.

The total turns in the example motor is 36×13=468 turns. Every turn of wire represents a bidirectional pass through the stator, so to operate at the same current, the motor requires twice as many conductors, or 936. Alternatively, the current and conductor size may be increased with a proportional decrease in conductor quantity, which is the preferred approach for smaller motors (perhaps less than 5 HP) because the larger conductors offer the rigidity needed for automated assembly.

The example motor uses two parallel strands of No. 19 wire, for a cross-sectional area of (2×1290 cmil) or 0.002 in$^2$ per turn. Multiplying by 2×468 turns gives a total winding cross-sectional area of 1.87 in$^2$.

Figure 3:
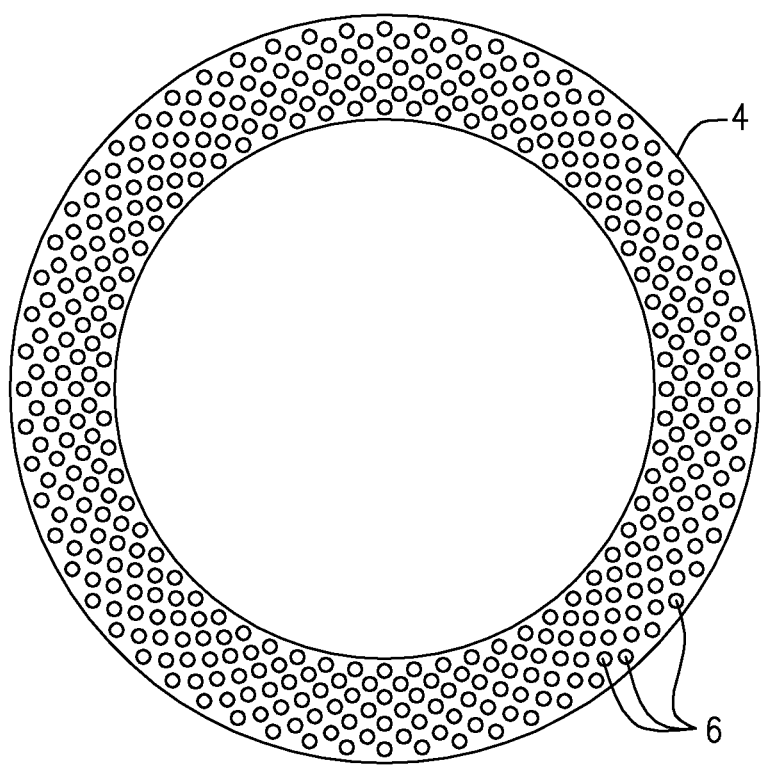
FIG. 3 is a cross-sectional view of a stator ring for use in an embodiment of the present invention.

In the above example, the cross-sectional area of the stator is calculated to be about 17.3 in$^2$, so the example motor has a winding-to-stator area ratio of 11%. No longer limited by the need to use slots, the motor of the present invention allows conductors to be evenly distributed over the cross-section of the stator core 2 as shown in FIG. 3. The conductor-to-stator area ratio is limited instead by conductor separation, semiconductor density at the end ring, and stator laminate structural considerations.

At a proposed ratio of 20%, the present motor conductors 8 have a total available area of 0.20×17.3 in$^2$, or 3.46 in$^2$. A convenient starting point for conductor sizing is 16 AWG, because it offers suitable stiffness. Its cross-sectional area is 2580 cmil, almost exactly matching the 0.002 in$^2$ of the two parallel 19-gauge wires. But at a 20% fill ratio, our 3.46 in$^2$ permits a total of 1730 conductors, doubling the required number. Alternatively, the wire size may be increased to reduce the conductor count and permit a higher current per conductor (and lower buss voltage).

The foregoing calculations suggest that the goal of at least duplicating the performance of a standard 3-phase induction motor using the present motor is possible in a similar motor frame size. One skilled in the art can evaluate the density and size of transistor commutation elements for the required current capacity for use in a general or particular application.

Figure 4:
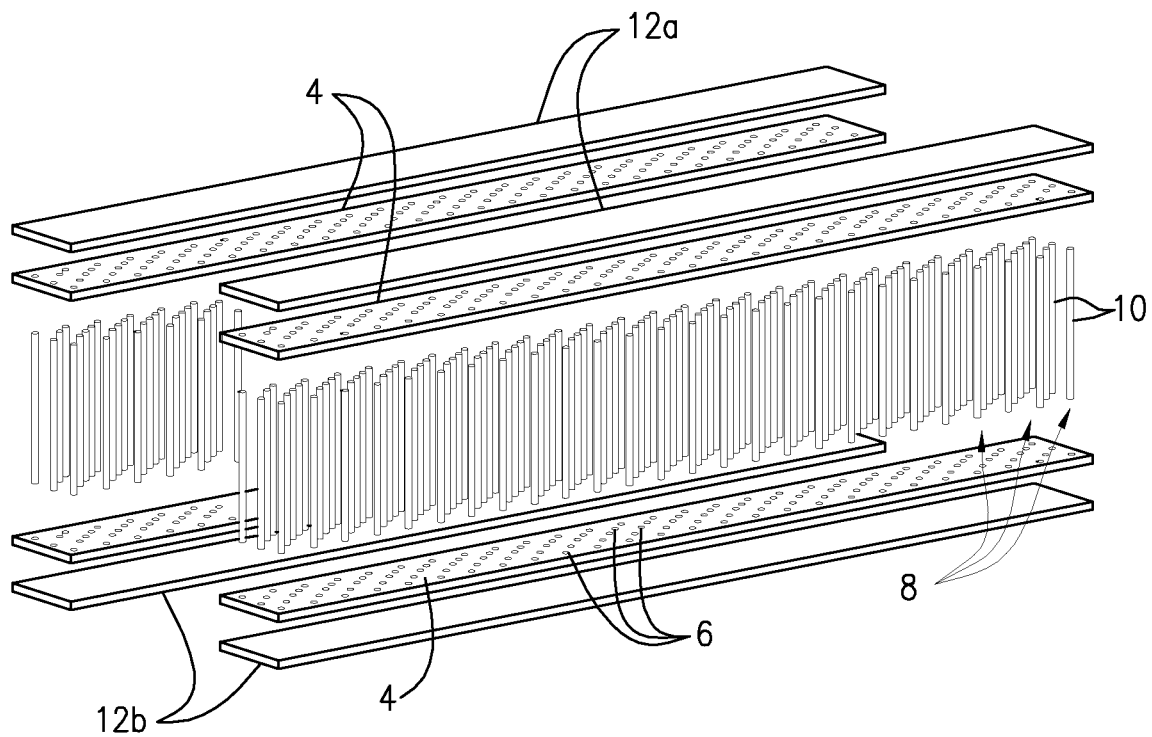
FIG. 4 is an exploded perspective view of an embodiment of the present invention in a linear array.
Figure 5:
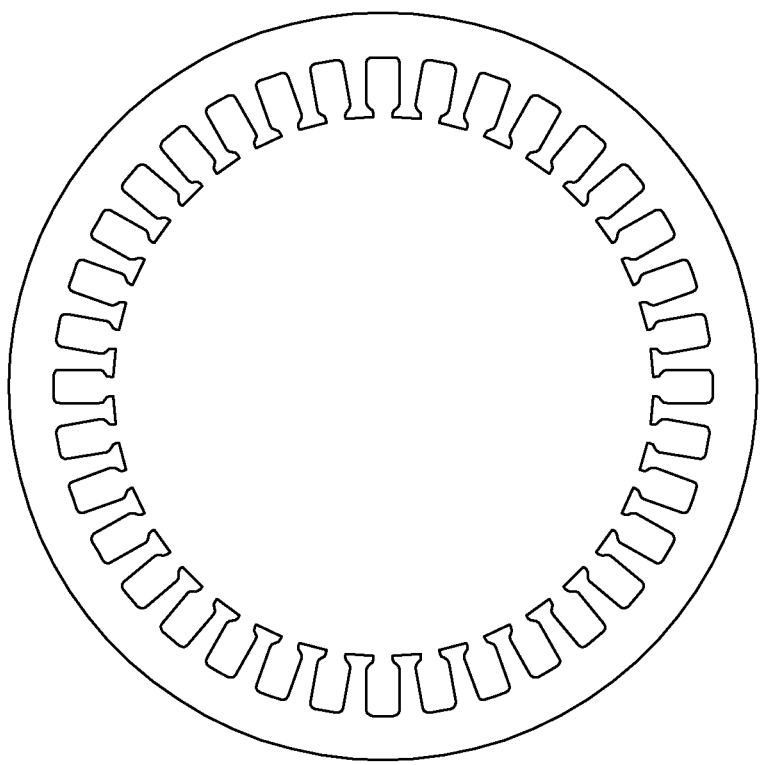
FIG. 5 is a cross-sectional view of a prior art stator ring used in wound conductor motors.

The improvement is not limited to application in rotating machines. The principals and construction methods are suitable for other geometries, including linear motors and actuators, an example of which is shown in FIG. 4. Here, conductors 8 are arranged in parallel linear stators 2 driven by integrated circuit drive members 12 that are in the form of strips rather than rings. Potential applications include linear motors and actuators, positioning systems, track locomotion and braking, acceleration of projectiles, etc.

The present invention extends to any device or arrangement requiring a moving magnetic field. In fact, the nature of the invention may be simply described as a "direct digital synthesizer" of a moving magnetic field.

The present invention further comprises a method of manufacturing an induction motor comprising the steps of providing a stator core 2 with a plurality of holes 6 having conductors within at least some of the plurality of holes 6, said conductors 8 having a substantially linear body portions 10 extending through the stator 2, placing an end member 12 on each end of the conductors 8, at least one of the end drive members 12 provided with electronic circuitry 14.

In one embodiment, the stator core 2 can be manufactured from a plurality of stack elements 4 forming a laminated core member 2.

In one embodiment, the conductors 8 can be inserted into the holes 6 in the stator core 2 after the stator core 2 is formed.

In one embodiment, at least one end drive member 12 can be provided with electronic circuitry.

Variations, modifications and alterations to the above detailed description will be apparent to those skilled in the art. All such variations, modifications and/or alternatives are intended to fall within the scope of the present invention, limited only by the claims. Any cited patents and/or publications are incorporated by reference.

I claim:

1. An electronic motor comprising a stator core having a plurality of holes therein and a plurality of conductors comprising a substantially linear body portion extending within at least some of the holes of the stator core, and a stator drive member adjacent first and second ends of the stator core, the stator drive member adjacent at least one of the first and second ends of the stator core comprising electronic control circuitry electrically coupled to at least some of the conductors, wherein the plurality of conductors are each coupled to at least one switch at each end of the substantially linear body portion and the substantially linear body portion of each of the plurality of conductors is substantially straight without a significant change in direction between the switches at each end.

2. The electronic motor of claim 1 wherein the stator core comprises a stack of laminate elements.

3. The electronic motor of claim 1 wherein at least a plurality of the conductors consist of a discrete, substantially linear body.

4. The electronic motor of claim 1 wherein the conductors comprise an insulation on at least a portion thereof.

5. The electronic motor of claim 1 wherein at least one of the stator drive members comprises printed circuitry.

6. The electronic motor of claim 1 wherein at least a plurality of the switches comprising the at least one switch at each end of the conductor are solid-state switches.

7. The electronic motor of claim 6 wherein the solid-state switches are formed of transistors coupled to an integrated circuit board.

8. The electronic motor of claim 7 wherein the integrated circuit board is associated with at least one of the stator drive members.

9. The electronic motor of claim 6 wherein the solid state switches are driven by a microcontroller.

10. The electronic motor of claim 9 wherein the microcontroller provides multiple motor functions, including one or more of a DC connection, a single-phase connection and a 3-phase connection.

11. The electronic motor of claim 6 wherein the solid-state switches are combined in a bidirectional bridge configuration.

12. The electronic motor of claim 1 wherein at least a plurality of the switches comprising the at least one switch at each end of the conductor are semiconductor switches.

13. The electronic motor of claim 1 wherein at least a plurality of the switches comprising the at least one switch at each end of the conductor are formed of transistors installed or fabricated directly onto at least one of the first and second ends of the stator core.

14. The electronic motor of claim 1 wherein each of the plurality of conductors coupled to at least one switch at each end of the conductor form discrete switch circuits.

15. The electronic motor of claim 14 wherein the switch circuits provide commutation to and from a negative and positive DC bus on at least one of the first and second ends of the stator core.

16. The electronic motor of claim 1 wherein each end of each of the plurality of conductors are coupled to three switches.

17. A method of manufacturing an electronic motor comprising the steps of providing a stator core with a plurality of holes having conductors within at least some of the plurality of holes, said conductors each having a substantially linear body portion extending through the stator core, and placing a drive member on each end of the stator core, at least one of the drive members provided with electronic circuitry, where the conductors are electrically coupled to the circuitry in the drive members, further comprising coupling at least one switch to each end of the plurality of substantially linear body portions wherein the substantially linear body of each of the plurality of conductors is substantially straight without a significant change in direction between the switches at each end.

* * * * *